July 6, 1954 W. E. OZMINA 2,682,880
VALVE MECHANISM FOR FLUSHING PIPE LINE MILKING SYSTEMS
Filed Nov. 22, 1952
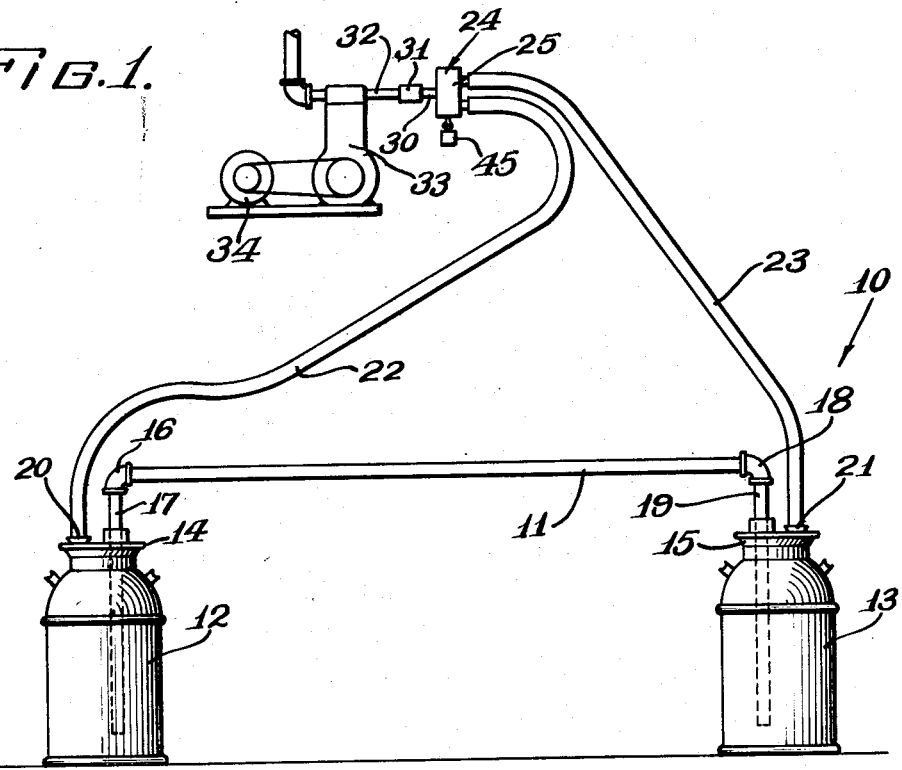
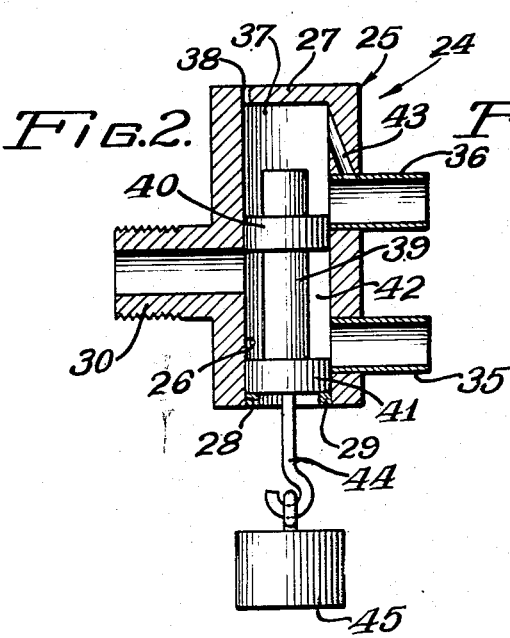
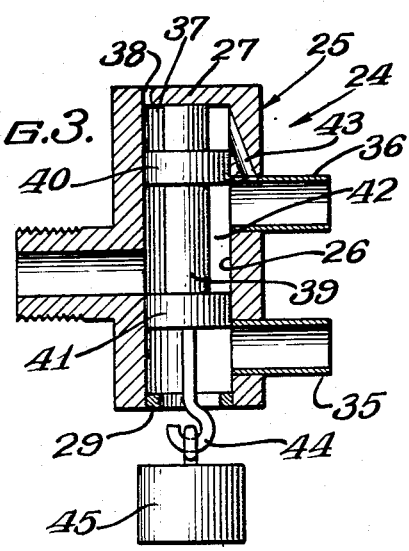
Inventor:
Walter E. Ozmina
Atty.

Patented July 6, 1954

2,682,880

UNITED STATES PATENT OFFICE 2,682,880

VALVE MECHANISM FOR FLUSHING PIPE LINE MILKING SYSTEMS

Walter E. Ozmina, Chicago, Ill., assignor to International Harvester Company, a corporation of New Jersey Application November 22, 1952, Serial No. 322,001

11 Claims. (Cl. 134—56)

This invention relates to a flushing and cleaning system and more particularly to a flushing arrangement for cleaning the milk pipe-line of a parlor milking system. More specifically, this invention relates to a novel regulating valve mechanism utilized in conjunction with the flushing mechanism of a pipe-line milker.

In the conventional pipe-line milking system, the milk line directs the milk from the animal to a series of cans which are placed under vacuum. In a device of this type the milk line is substantially removed from possible contamination with the air so that the bacteria growth in the milk is kept at a minimum. In order to periodically cleanse the milk pipe-line, it is desirable to pass a cleansing solution back and forth through the pipe-line a successive number of times so that proper and effective cleansing of the line may be accomplished. In the cleansing of the milk pipe-line it is also desirable that the connection to the flushing system can be made with a minimum of effort on the part of the operator. To accomplish this a milk line is generally connected at both of its ends to closed milk cans or similar containers. One of the cans is substantially filled with a cleansing solution and both of the cans are connected by separate lines to a suitable source of vacuum such as a vacuum pump. Various control devices such as pulsating units have been disposed between the vacuum pump and the conduits so that vacuum and air may be alternately applied to each of the containers. When one container contains the washing solution, the other container is subjected to vacuum which thereupon draws the washing solution through the pipe line into the container under vacuum. This process is reversed and the same cycle takes place whereupon the flow of washing solution is reversed. The cycle is repeated many times and thus, the pipe-line is effectively cleansed. It is a prime object of this invention to provide an improved simplified and inexpensive regulating valve mechanism connected to the cans of the system whereby the cans may alternately be subjected to vacuum and atmosphere so that the flushing operation can effectively be accomplished.

A more specific object of the invention is to provide an improved valve mechanism for alternately subjecting the containers of a flushing system to atmosphere and vacuum, the mechanism including a casing having a first chamber which is alternately under vacuum and atmosphere and a second chamber continually under vacuum, the casing further including a valve member which in one position connects the second vacuum chamber of the casing to a first can whereby said can is subjected to a vacuum and washing liquid flows from a second can which is simultaneously under atmosphere to the first can thereby washing the pipe line which is connected to and in communication with the cans, the valve mechanism also including a restricted orifice in communication with the atmosphere whereby during a certain condition within the system a vacuum is provided in the first chamber whereupon the valve member is actuated to place the second can in connection with the second vacuum chamber and whereupon the first container is exhausted to the atmosphere and the liquid flow is reversed from the first container through the pipe line to the second container.

Further specific objects and the means by which they may be accomplished are further disclosed in the ensuing description when examined in connection with the accompanying sheet of drawing.

Figure 1 is a side elevational view of a flushing system and valve mechanism therefore for flushing the milk line of a milking system;

Figure 2 is a cross sectional view through an improved valve and regulating mechanism for a pipe flushing system showing the valve plunger positioned in a first operating position; and Figure 3 is a cross sectional view through the valve mechanism shown in Figure 2, the view showing a valve plunger in a second operating position during the flushing cycle of a milk line flushing system.

Referring particularly to Figure 1 a pipe-line flushing system is generally designated by the reference character 10. The flushing system 10 comprises a pipe line to be flushed which is designated at 11. The pipe line 11 is utilized in connection with the vacuum milking system of a parlor milker but for the purposes of clarity the relevant parts of the milking system have been deleted and only the parts necessary to the flushing system have been disclosed. The pipe line 11 is connected at one end to a first milk can or container 12, and its other end to a second milk can or container 13. Standard milk can covers 14 and 15 may be respectively connected to the cans 12 and 13 for suitably closing the same. The pipe-line 11 at one end is provided with an elbow 16 which in turn is connected to a vertical conduit 17 extending through the cover 14 adjacent to the bottom of the can 12. The other end of the pipe 11 is connected to an elbow 18 which in turn is connected to a vertical conduit 19 also extending through the cover 15 adjacent to the bottom of the can 13. The cover 14 is provided with a vacuum and air connection 20 and the cover 15 is provided with a vacuum and air connection 21.

First and second conduits 22 and 23 are respectively connected to the vacuum and air connections 20 and 21. A valve control mechanism 24 is shown in Figures 1 through 3, this mechanism being generally designated at 24.

The valve control mechanism 24 comprises a casing 25 provided with an elongated bore 26 which is closed at its upper end by means of an upper wall 27 integral with the casing 25. The bore 26 is provided with a lower open end 28. A ring 29 is suitably connected adjacent the lower open end 28 of the bore 26.

A vacuum connection 30 is provided on the casing 25. The vacuum connection 30 is in communication with a connector 31 in turn connected to a pipe 32 in operative connection with a vacuum pump 33. The vacuum pump 33 may be of conventional construction including a power unit 34 for actuating said pump.

Referring now particularly to Figures 2 and 3, a first vacuum and air conduit connection 35 is adapted to communicate with the bore 26, this conduit connection 35 also being in communication with the conduit 22. A second vacuum and air conduit connection 36 is in communication with the bore 26 and is in turn connected to the second conduit 23 for communication therewith.

A first chamber 37 is positioned at the upper end of the bore 26. The chamber 37 has a limited communication with the atmosphere by means of a restricted orifice 38 in the casing 25. A valve plunger 39 is positioned for reciprocation within the bore 26. The valve plunger 39 comprises a land 40 adjacent its upper end. A land 41 is also provided on the valve plunger 39, the land 41 being axially spaced with the respect to the land 40 to provide within the bore 26 a second chamber 42. The second chamber 42 is in continual communication with the vacuum connection 30 and the vacuum pump 33.

The vacuum and air conduit connection 36 is in continual communication with the chamber 37 by means of a passage 43 provided in the casing 25. The passage 43 is considerably larger in cross section than the orifice 38 and thus has a greater air flow capacity than is provided to the chamber 37 by means of the orifice 38. A hook 44 is connected to the lower end of the valve plunger 39 the hook 44 having a weight 45 connected thereto.

In the operation, a washing liquid is provided within the container 13. The regulating or control valve mechanism 24 has its plunger 39 in the first position as indicated in Figure 2. During this position the chamber 42 is in communication with the conduit connection 35 whereupon vacuum is present in the conduit 22 and in the container 12. At the same time the conduit connection 36 is in full communication with the chamber 37 and air flows through the orifice 38 through the conduit connection 36, and the conduit 23 to the container 13 whereupon liquid is forced through the pipe-line 11 from the container 13 to the container 12. The liquid traveling from the container 13 through the pipe-line 11 to the container 12 is slowed up considerably by the friction of the pipe-line. Thus, the air which enters through the restricted orifice 38 is sufficient to take the place of the liquid as it is drawn from the container 13. Thus, pressure is present in the container 13 and this pressure is not materially reduced. After all of the liquid has passed from the container 13 to the container 12, however, the air flow from the container 13 through the pipe-line 11 to the container 12 is very rapid. This air flow is sufficiently great so that a vacuum builds up in the can 13, the line 23, and in the chamber 37 since now an insufficient quantity of air enters through the orifice 38. The pressure differential between chambers 37 and 42 results in the movement of the valve plunger 39 to the position shown in Figure 3.

When the valve plunger has moved to the position indicated in Figure 3, the land 40 is positioned so that the chamber 42 is in communication with the conduit connection 36. The land 41 has moved to cut off the chambers 42 from the conduit connection 35, the conduit connection 35 now being in continual communication with the atmosphere through the lower open end 28 of the bore 26. It can now be seen that the can 12 which contains the washing solution, is under atmospheric connection with respect to the conduit 22, and the conduit 23 is directly connected to the chamber 42 whereupon a vacuum exists in the container 13. The liquid from the container 12 now starts flowing through the pipe-line 11 to the container 13 and thus, the washing cycle is reversed. The valve plunger 39 is held in the position shown in Figure 3, since the air in the chamber 37 escapes through the passage 43 and to the pump 33 much faster than air can enter through the orifice 38. However, after all of the washing solution has passed from the can 12 to the can 13 there is no longer any liquid blocking of the milk line 11 and air is drawn through the milk line 11 from the can 12 and through the conduit 23 at a very fast rate. The pump 33 is now no longer able to maintain a normal vacuum. The vacuum existing in the chamber 37 is now reduced by virtue of the entrance of sufficient air through the orifice 38 so that the valve plunger 39 is now forced downwardly by means of the weight 45, thus, returning to its first position as indicated in Figure 2 whereupon another complete cycle of operation can take place. Thus, it can be seen that as long as the milk line 11, blocked with liquid flowing through the line a sufficient vacuum can be maintained in the chamber 37 to keep the valve plunger 39 in its second position indicated in Figure 3 against the force of the weight 35. However when the milk line 11 no longer has the liquid flowing therein the rapid flow of air from the container 12 to the container 13 is sufficient to cause a reduction in the vacuum existing in the chamber 37 so that the weighted plunger can move by gravity to the position indicated in Figure 2. It is of course possible to use biasing means other than a weight for effecting the downward movement of the valve plunger 39. Spring type means might be provided or the valve plunger 39 might have sufficient inherent weight to effect the gravitational action desired when a vacuum drop occurs in the chamber 37. As indicated in Figure 2 the ring 29 positioned at the lower end of the bore 26 is effective to limit the downward movement of the valve plunger 39.

As indicated the passage 43 has a larger cross sectional area than the orifice 38 and thus the flow of air through the passage 43 during the position indicated in Figure 3 is greater than the influx of air through the orifice 38 into the chamber 37. By this novel arrangement then, the chamber 37 will be maintained under a vacuum sufficient to maintain the valve plunger 39 in this position until liquid has been removed from the container 12 to the container 13.

It can now be seen that the objects of the invention have been fully achieved and that a novel valve mechanism for a pipe-line flushing arrangement has been provided. It must be understood that changes and modifications may be made which do not depart from the spirit of the invention as disclosed nor the scope thereof is defined in the appended claims.

What is claimed is:

1. In a pipe-line flushing system including first and second closed liquid containers having a pipe-line to be flushed connected to and in communication with said liquid containers, first and second vacuum and air connections respectively in communication with said first and second containers, and a source of vacuum adapted to alternately communicate with said first and second connections; a valve mechanism for controlling communication between said vacuum and air connections and said source of vacuum, said mechanism comprising a casing, said casing having an elongated bore, a closure wall over one end of said bore, said closure wall having an orifice in communication with the atmosphere, the lower end of said bore having an opening in communication with the atmosphere, a valve plunger reciprocally positioned within said bore, said valve plunger including a first land defining with said bore a first chamber in communication with the atmosphere through said orifice, a second land on said plunger, said second land being axially spaced with respect to said first land and providing with said first land and with said bore a second chamber, first and second conduit connections on said casing, first and second hose means respectively connecting said first and second conduit connections and being adapted to connect respectively to said first and second vacuum and air connections, a vacuum connection on said casing adapted to connect to the source of vacuum to provide a continuous vacuum in said second chamber, a passage in said casing providing for communication between said first chamber and said second conduit connection, said passage having a greater flow capacity than the orifice in communication with the atmosphere, said valve plunger being positioned in a first position during a higher vacuum in said second chamber than in said first chamber wherein said second chamber is in communication with said first conduit connection and a vacuum is applied to the first container to provide for the flow of liquid from the second container to said first container through said pipe-line, and wherein said second container is in direct communication with said first chamber through said second conduit connection and through said passage, said valve plunger being movable to a second position during a higher vacuum in said first chamber than in said second chamber wherein said first conduit connection and said first container are in direct communication with the atmosphere through the opening of said bore, and said second conduit connection and said second container are in direct communication with the second chamber, and said first chamber is in limited communication with said second conduit connection through said passage, and means for urging said plunger to its first position during a vacuum drop in said first chamber; said means including a weighted member connected to said valve plunger.

2. In a pipe-line flushing system including first and second closed liquid containers having a pipe-line to be flushed connected to and in communication with said liquid containers, first and second vacuum and air connection respectively in communication with said first and second containers, and a source of vacuum adapted to alternately communicate with said first and second connections; a valve mechanism for controlling communication between said vacuum and air connections and said source of vacuum; said mechanism comprising a casing, said casing having an elongated bore, a closure wall over one end of said bore, said closure wall having an orifice in communication with the atmosphere, the lower end of said bore having an opening in communication with the atmosphere, a valve plunger reciprocally positioned within said bore, said valve plunger including a first land defining with said bore a first chamber in communication with the atmosphere through said orifice, a second land on said plunger, said second land being axially spaced with respect to said first land and providing with said first land and with said bore a second chamber; first and second conduit connections on said casing, first and second hose means respectively connecting said first and second conduit connections and being adapted to connect respectively to said first and second vacuum and air connections, a vacuum connection on said casing adapted to connect to the source of vacuum to provide a continuous vacuum in said second chamber, a passage in said casing providing for communication between said first chamber and said second conduit connection, said passage having a greater flow capacity than the orifice in communication with the atmosphere, said valve plunger being positioned in a first position during a higher vacuum in said second chamber than in said first chamber wherein said second chamber is in communication with said first conduit connection and a vacuum is applied to the first container to provide for the flow of liquid from the second container to said first container through said pipe-line, and wherein said second container is in communication with said first chamber directly through said second conduit connection and through said passage, said valve plunger being movable to a second position during a higher vacuum in said first chamber than in said second chamber wherein said first conduit connection and said first container are in direct communication with the atmosphere through the opening in said bore, and said second conduit connection and said second container are in direct communication with the second chamber, and said first chamber is in limited communication with said second conduit connection through said passage, and means for urging said plunger to its first position during a vacuum drop in said first chamber.

3. In a pipe-line flushing system including first and second closed liquid containers having a pipe-line to be flushed in communication with said liquid containers, first and second vacuum and air connections respectively in communication with said first and second containers, and a source of vacuum adapted to alternately communicate with said first and second connections; a valve mechanism for controlling communication between said vacuum and air connections and said source of vacuum; said mechanism comprising a casing, said casing having an elongated bore closed at one end and open at the other, said casing having an orifice in communication with the atmosphere, a valve plunger reciprocally positioned within said bore, said valve plunger including a first land defining with said bore a first chamber in communication with the atmosphere through said orifice, a second land on said plunger, said second land being axially spaced with respect to said first land and providing with said first land and with said bore a second chamber, first and second conduit connections on said casing, first and second hose means respectively connecting said first and second conduit connections and being adapted to connect repectively to said first and second vacuum and air connections, a vacuum connection on said casing adapted to connect to the source of vacuum to provide a continuous vacuum in said second chamber, a passage in said casing providing for communication between said first chamber and said second conduit connection, said passage having a greater flow capacity than the orifice in communication with the atmosphere, said valve plunger being positioned in a first position during a higher vacuum in said second chamber than in said first chamber wherein said second chamber is in communication with said first connection and a vacuum is applied to the first container to provide for the flow of liquid from the second container to said first container through said pipe-line and wherein said second container is in communication with said first chamber directly through said second conduit connection and through said passage, said valve plunger being movable to a second position during a higher vacuum in said first chamber than in said second chamber wherein said first conduit connection and said first container are in direct communication with the atmosphere through the opening in said bore, and said second conduit connection and said second container are in direct communication with the second chamber, and said first chamber is in limited comomunication with said second conduit connection through said passage, and biasing means for urging said plunger to its first position during a vacuum drop in said first chamber.

4. In a pipe-line flushing system including first and second closed liquid containers having a pipe-line to be flushed in communication with said containers, first and second conduits connected respectively to said first and second containers, and a source of vacuum adapted to alternately communicate with said first and second conduits; a vacuum and air control mechanism comprising a casing, said casing including an elongated bore, the bore being substantially open at one end to the atmosphere and being substantially closed at its other end, a valve plunger reciprocally positioned within the bore, said plunger including a first land defining with said closed end of the bore a first chamber, said casing including an orifice to provide for the limited entrance of air into said first chamber, a second land on said plunger axially spaced from said first land and providing with said first land and with said bore a second chamber, a vacuum connection adapted to communicate with the source of vacuum to continually provide a vacuum within said second chamber, a first connection connected to the first conduit, a second conduit connection connected to said second conduit, said second conduit connection having an open end adapted to communicate with said first chamber during a first position of said valve plunger whereby air in said first chamber flows to said second container, a passage in said casing in continual communication with the second container and said first chamber, said passage having a greater air flow capacity than said orifice, said first conduit connection having an open end in communication with said second chamber during the first position of said valve plunger whereby a vacuum is provided in said first container, said valve plunger being movable during a higher vacuum in said first chamber than in said second chamber to a second position whereupon said first conduit is directly in communication with the open end of said bore and air flows to said first container, and said second conduit is in communication with said second chamber whereby a vacuum is present in said second container, and means for returning said valve plunger to said first position during a lowering of the vacuum in said first chamber, said means including a weighted member connected to said valve plunger.

5. In a pipe-line flushing system including first and second closed liquid containers having a pipe-line to be flushed in communication with said containers, first and second conduits connected respectively to said first and second containers and a source of vacuum adapted to alternately communicate with said first and second conduits; a vacuum and air control mechanism comprising a casing, said casing including an elongated bore, the bore being substantially open at one end to the atmosphere and closed at its other end, a valve plunger reciprocally positioned within the bore, said plunger including a first land defining with said closed end of the bore a first chamber, said casing including a restricted orifice to provide for the limited entrance of air into said first chamber, a second land on said plunger axially spaced from said first land and providing with said first land and said bore a second chamber, a vacuum connection adapted to communicate with the source of vacuum to continually provide a vacuum within said second chamber, a first conduit connection connected to the first conduit, a second conduit connection connected to said second conduit, said second conduit connections having an open end adapted to communicate with said first chamber during a first position of said valve plunger whereby air in said first chamber flows to said second container, a passage in said casing in continual communication with the said second container and said first chamber, said passage having a greater air flow capacity than said orifice, said first conduit connection having an open end in communication with said second chamber during the first position of said valve plunger whereby a vacuum is provided in said first container, said valve plunger being movable during a higher vacuum in said first chamber than in said second chamber to a second position whereupon said first conduit is directly in communication with the open end of said bore and air flows to said first container, and said second conduit is in communication with said second chamber whereby a vacuum is present in said second container, and means for returning said valve plunger to said first position during a lowering of the vacuum in said first chamber, said means including a biased member connected to said valve plunger.

6. In a pipe-line flushing system including first and second closed liquid containers having a pipe-line to be flushed in communication with said containers, first and second conduits containers and a source of vacuum adapted to alternately communicate with said first and second conduits; a vacuum and air control mechanism comprising a casing, said casing including an elongated bore, the bore being substantially open at one end to the atmosphere and being closed at its other end, a valve plunger reciprocally positioned within the bore, said plunger including a first land defining with said closed end of the bore a first chamber, said casing including a restricted orifice to provide for the limited entrance of air into said first chamber, a second land on said plunger axially spaced from said first land and providing with said first land and said bore a second chamber, a vacuum connection adapted to communicate with the source of vacuum to continually provide a vacuum within said second chamber, a first conduit connection connected to the first conduit, a second conduit connection connected to said second conduit, said second conduit connection having an open end adapted to communicate with said first chamber during a first position of said valve plunger whereby air in said first chamber flows to said second container, a passage in said casing in continual communication with the said second container, and said first chamber, said first conduit connection having an open end in communication with said second chamber during the first position of said valve plunger whereby a vacuum is provided in said first container, said valve plunger being movable during a pressure differential between said first and second chambers to a second position whereupon said first conduit is directly in communication with the open end of said bore and air flows to said first container, and said second conduit is in communication with said second chamber whereby a vacuum is present in said second container, and means for returning said valve plunger to said first position during a lowering of the vacuum in said first chamber.

7. In a pipe-line flushing system including first and second closed liquid containers having a pipeline to be flushed in communication with said containers, first and second conduits connected respectively to said first and second containers, and a source of vacuum adapted to alternately communicate with said first and second conduits; a vacuum and air control mechanism comprising a casing, said casing including an elongated bore, the bore being substantially open at one end to the atmosphere and being closed at its other end, a valve plunger reciprocally positioned within the bore, said plunger including a first land defining with said closed end of the bore a first chamber, said casing including a restricted orifice to provide for the limited entrance of air into said first chamber, a second land on said plunger axially spaced from said first land and providing with said first land and said bore a second chamber, a vacuum connection adapted to communicate with the source of vacuum to continually provide a vacuum within said second chamber, a first conduit connection connected to the first conduit, a second conduit connection connected to said second conduit, said second conduit connection having an open end adapted to communicate with said first chamber during a first position of said valve plunger whereby air in said first chamber flows to said second container, a passage in said casing in continual communication with the said second container and said first chamber, said first conduit connection having an open end in communication with said second chamber during the first position of said valve plunger whereby a vacuum is provided in said first container, said valve plunger being movable during a pressure differential between said first and second chambers to a second position whereupon said first conduit is directly in communication with the open end of said bore and air flows to said first container, and said second conduit is in communication with said second chamber whereby a vacuum is present in said second container, and means for returning said valve plunger to said first position during a decrease of the vacuum in said first chamber.

8. In a pipe-line flushing system including first and second closed liquid containers having a pipe line connected thereto to provide for liquid travel between said containers during a pressure differential in said containers whereby said pipe line is flushed, first and second vacuum and air conduits connected respectively to said first and second containers, and a source of vacuum; a vacuum and air control mechanism including a casing having a first chamber and a second chamber, a vacuum connection to provide for continual communication between said second chamber and said source of vacuum, first means connecting said first conduit to said casing, second means connecting said second conduit to said casing, a valve means in said casing, said valve means being movable to a first position wherein said first conduit is in communication with said second chamber and said second conduit is in communication with said first chamber, said casing having a restricted orifice in communication with said first chamber to permit the flow of air to said second conduit when said valve means is in said first position, said valve means being movable to a second position to connect said first conduit to the atmosphere and said second conduit to said second chamber, passage means between said first chamber and said second chamber to direct air from the first chamber to said second chamber during the second position of said valve, said valve being returned to its first position during a vacuum drop in said first chamber.

9. In a pipe-line flushing system in accordance with claim 8 wherein said passage has a greater flow capacity than said orifice whereby a vacuum is provided in said first chamber during the first position of said valve.

10. In a pipe-line flushing system in accordance with claim 9 wherein a biasing means is connected to said valve means to return said valve means to the first position during the vacuum drop in said first chamber.

11. In a pipe-line flushing system including first and second closed liquid containers having a pipe-line to be flushed connected to said liquid containers, first and second vacuum and air connections respectively in communication with said first and second containers, and a source of vacuum adapted to alternately communicate with said first and second connections; a valve mechanism for controlling the communication between said vacuum and air connections and said source of vacuum, said mechanism comprising a casing, said casing having an elongated bore closed at one end and open at the other, said casing having an orifice in communication with the atmosphere, a valve plunger reciprocally positioned within said bore, said valve plunger including a first land defining with said bore a first chamber in communication with the atmosphere through said orifice, a second land on said plunger, said second land being axially spaced with respect to said first land and providing with said first land and with said bore a second chamber, first and second conduit connections on said casing, first and second hose means respectively connecting said first and second conduit connections and being adapted to connect respectively to said first and second vacuum and air connections, a vacuum connection on said casing adapted to connect to the source of vacuum to provide a continuous vacuum in said second chamber, a passage in said casing providing for communication between said first chamber and said first conduit connection, said valve plunger being positioned in a first position during a higher vacuum in said second chamber than in said first chamber wherein said second chamber is in communication with said first conduit connection and a vacuum is applied to the first container to provide for the flow of liquid from the second container to said first container through said pipe line and wherein said second container is in direct communication with said first chamber through said second conduit connection and through said passage, said valve plunger being movable to a second position during a higher vacuum in said first chamber than in said second chamber wherein said first conduit connection and said first container are in direct communication with the atmosphere through the opening in said bore, and said second conduit connection and said second container are in direct communication with the second chamber, and said first chamber is in limited communication with said second conduit connection through said passage, and biasing means for urging said plunger to its first position during a vacuum drop in said first chamber.

No references cited.